United States Patent [19]
Suppus

[11] 4,002,284
[45] Jan. 11, 1977

[54] METHOD OF MAKING A COLD WELDED CONNECTION

[75] Inventor: Heinz F. W. Suppus, Meschede, Germany

[73] Assignee: Metall-Werk Merkur GmbH, Velmede, Germany

[22] Filed: Dec. 13, 1974

[21] Appl. No.: 532,712

Related U.S. Application Data

[63] Continuation of Ser. No. 266,542, June 27, 1972, abandoned.

[30] Foreign Application Priority Data

June 29, 1971 Germany .......................... 2132139

[52] U.S. Cl. ............................................. 228/115
[51] Int. Cl.² ......................................... B23K 21/00
[58] Field of Search ............... 228/115, 116, 136; 29/521, 525

[56] References Cited
UNITED STATES PATENTS

| | | | |
|---|---|---|---|
| 2,017,154 | 10/1935 | Larkin ............... | 29/525 X |
| 2,018,073 | 10/1935 | Laise .................. | 228/136 |
| 2,544,304 | 3/1951 | Eckenbeck et al. ........ | 29/525 |
| 2,839,640 | 6/1958 | Epstein ............ | 228/115 X |
| 3,068,508 | 12/1962 | Heyer ................. | 29/525 |
| 3,252,204 | 5/1966 | McFaddan ............ | 228/116 |
| 3,364,562 | 1/1968 | Armstrong ............ | 228/107 |
| 3,664,012 | 5/1972 | Wilke et al. .......... | 228/115 |
| 3,786,559 | 1/1974 | Smith ................. | 228/115 |
| 3,877,249 | 4/1975 | Sager ................. | 228/136 |

FOREIGN PATENTS OR APPLICATIONS

| | | |
|---|---|---|
| 1,500,715 | 5/1969 | Germany ............ 228/115 |
| 984,819 | 3/1965 | United Kingdom |

*Primary Examiner*—Al Lawrence Smith
*Assistant Examiner*—Robert C. Watson
*Attorney, Agent, or Firm*—Walter Becker

[57] ABSTRACT

A cold welded connection of a first member with a second member, according to which a ribbed portion associated with the first member and having ribs of at least nearly triangular cross section is pressed into a receiving depression which is slightly undersized relative to the ribbed portion thereby cold welding the first and second members together the ribs of the ribbed portion including ribs extending in the direction in which the ribbed portion is being pressed into the receiving depression.

9 Claims, 15 Drawing Figures

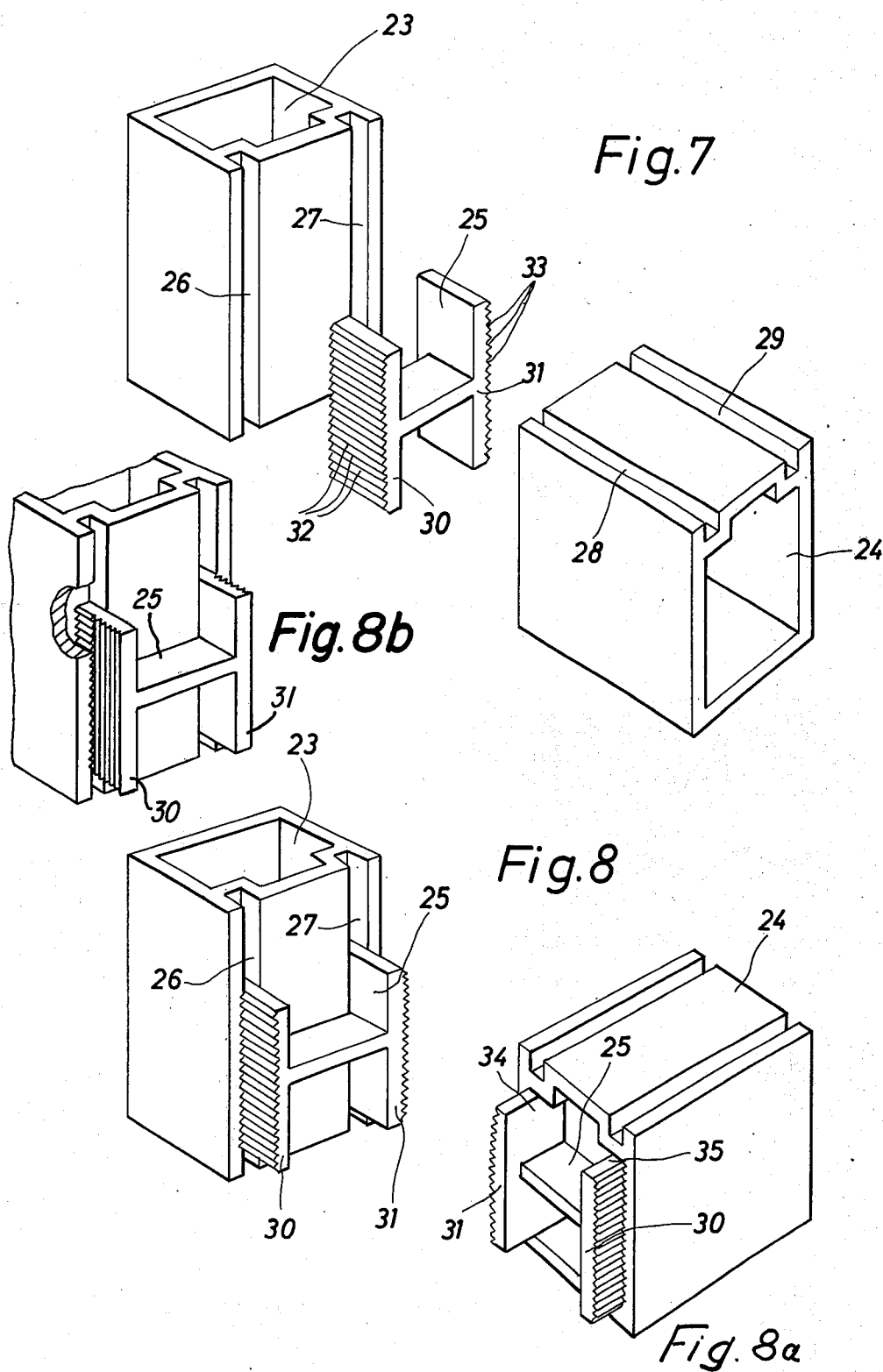

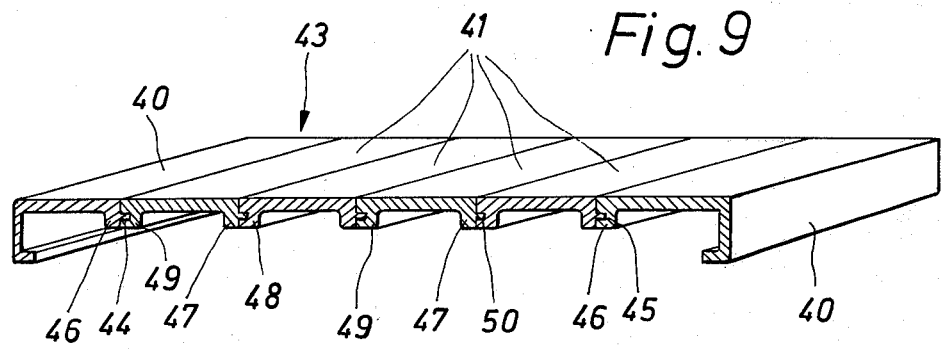
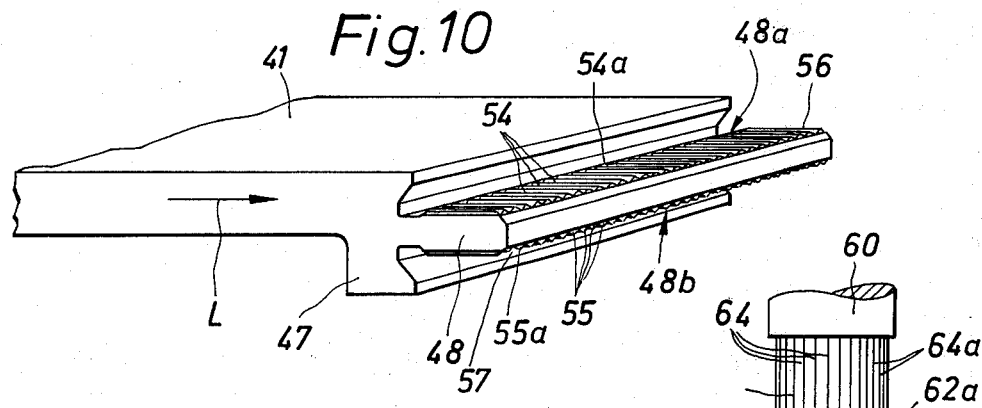
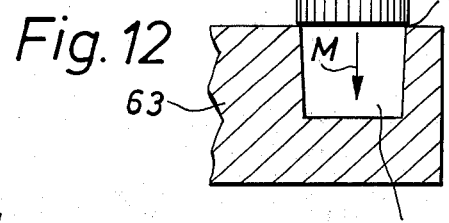
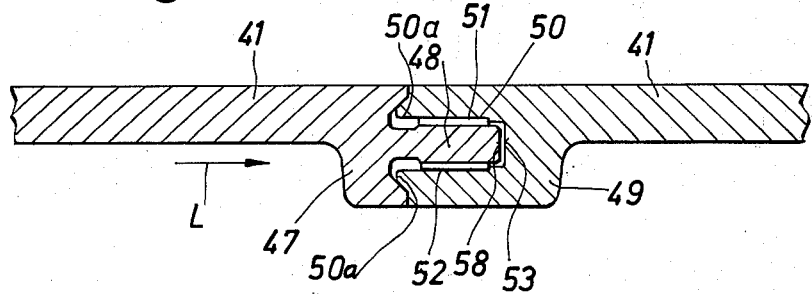
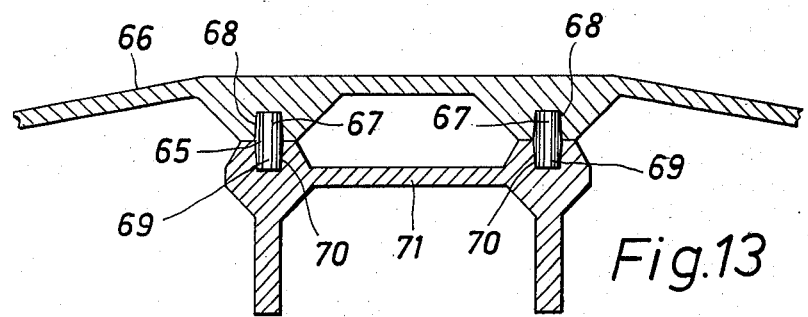

METHOD OF MAKING A COLD WELDED CONNECTION

This is a continuation of application Ser. No. 266,542, filed June 27, 1972, now abandoned.

The present invention relates to a cold welded connection of two parts which are pressed against each other and consist of cold weldable material, especially light metal, in which one part is provided with ribs of triangular cross section, the ribs having outer acute angular edges which when the two parts are pressed against each other are cold welded to a counter surface of the other part.

U.S. Pat. No. 3,167,320 describes a cold welded connection according to which the end faces of two parts to be connected to each other are pressed against each other. One of these parts has ribs of a triangular cross section the outer acute angular edges of which are when the two parts are pressed against each other cold welded to the counter surface of the other part. In this instance an exclusive pressure welding is involved.

German Auslegeschrift Pat. No. 1,064,761 discloses a fitting pin which is equipped with ribs of triangular cross section extending approximately in the longitudinal direction of the pin while the acute angular edges of these ribs cut into the wall of a bore of the part receiving the fitting pin in order in this way to assure a precise fitting of the pin in the bore. The pin is to be held in the bore in such a way that it cannot turn. A welding of the pin in the bore is not effected.

It is an object of the present invention to provide a cold welded connection of the above described general character which will afford a wide field of employment without the necessity of using expensive manufacturing devices while the connection will be able to withstand high stresses.

This object and other objects and advantages of the invention will appear more clearly from the following specification in connection with the accompanying drawings, in which:

FIG. 7 is an exploded view of another modified welded connection according to the invention for the interconnection of two profile pipes of quadrangular cross section.

Figure 1:
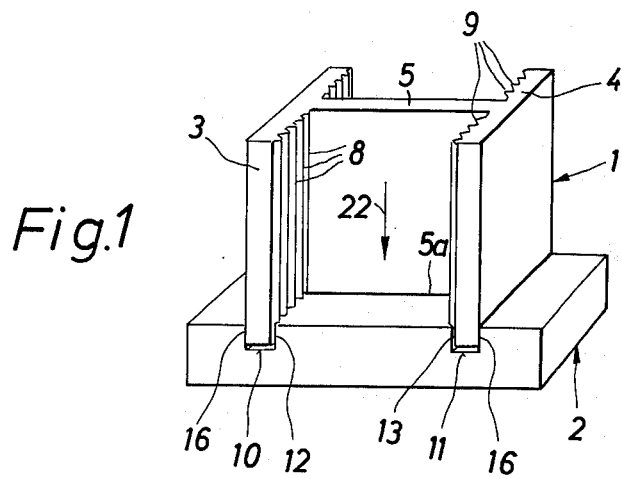
FIGS. 1 to 5 illustrate a cold welding connection according to the invention of an I-beam profile with a ledge-like second part.

FIGS. 8 and 8a respectively illustrate a step to be followed for establishing the welded connection shown in exploded view in FIG. 7.

FIG. 8b is a still further modification of the invention.

FIGS. 9 to 13 respectively illustrate further possible cold welded connections according to the present invention.

The cold welded connection according to the present invention is characterized primarily in that one part of the two parts to be interconnected is provided with ribs which extend in or approximately in the direction in which the two parts are to be pressed together while the counter surface of the other part is relative to the direction in which the parts are to be pressed against each other inclined by an angle $\alpha$ with regard to that end of the ribs which in the said direction represents the front end.

According to a further development of the invention, in the starting condition of the parts to be interconnected, the acute angular rib edge protrudes beyond the front edge of the counter surface (when viewed in the direction in which the parts are to be pressed against each other). Furthermore, the counter surface may be provided with ribs extending in a direction transverse to the direction in which the parts are to be pressed together.

With one of the possible ways of connecting the two parts, the counter surface may form the wall of a groove, and the part provided with the ribs may be in the form of a web or strip adapted to be inserted into the groove, the groove having its upper edge undersized relative to the part provided with the ribs.

Furthermore, the surface of the rib-equipped part which faces away from the triangular ribs may have a smooth wall, and also the groove of the second connecting part may be smooth-walled. The groove of the second connecting part will in this instance have a trapezoidal cross section.

With the just described embodiment the second grooved wall forms a counter bearing which receives a portion of the wall pressure which occurs when the parts are pressed against each other. A similar situation prevails when, according to a further embodiment of the invention, one connecting part has two parallel rib-shaped sections while the ribs are directed toward or away from each other, and the second connecting part has two parallel grooves of trapezoidal cross section. According to a still further embodiment of the invention the ribs are arranged on oppositely located sides of a strip or ledge while the walls of the groove are inclined toward each other and toward the groove bottom.

Another possibility for a cold welded connection according to the present invention consists in that that part which is provided with the longitudinal ribs forms a round pivot the ribbed portion of which extends into a conically tapering bore of the second part to be connected to the first part.

Furthermore, one of the two parts to be interconnected may be equipped with a pivot having two conical sections or a strip or ledge with two cross sectional sections which form an image to each other and are provided with inclined surfaces, one section each of the pivot or strip extending into a bore each of the two parts to be connected to each other.

Referring now to the drawings in detail, and more specifically to FIGS. 1–4, these figures show two parts 1 and 2 which are to be connected to each other. Of these two parts, the part 1 has an I-beam-shaped cross section and two arms 3, 4 interconnected by the web 5. The lower edge 5a of the web 5 ends at a level higher than the lower ends 3a, 4a of the arms 3, 4 so that sections 6, 7 are formed (FIG. 2) which extend below the lower edge 5a of web 5 and form the connecting sections of part 1. As will be evident from FIG. 3, those surfaces of the sections 6, 7 which face each other are provided with ribs 8, 9 of triangular cross section which may extend up to the height of the web 5 as shown in FIG. 1. The ribs 8, 9 are extending parallel to each other and in the longitudinal direction of the connecting part 1.

The connecting part 2 is provided with two grooves 10, 11 which are spaced from each other by a distance equalling the distance between the two arms 3, 4. Grooves 10, 11 are of trapezoidal cross section while those groove walls 12, 13 which face each other and form a counter surface for the ribs 8, 9 are inclined at an angle α relative to the vertical plane and thus relative to the wall 16.

The connecting sections 6, 7 including the ribs have a width x whereas the downwardly tapering grooves 10, 11 have at their upper groove opening 17 a width y. The width y is slightly less than the width x of the ribbed sections 6 and 7. In this way, when the two parts 1 and 2 are being connected to each other, first by means of the groove edge 18, i.e. the upper edge of the counter surface 12, for instance the acute angular edges 8a, 9a of the ribs 8, 9, will be scraped off so that the latter will be free from oxide. During the further vertical insertion of the portions 6, 7 into the grooves 10, 11, which in view of their trapezoidal cross section are with increasing depth further undersized relative to the rib-equipped portions 6, 7, a plastic deformation, i.e. a flattening of the ribs 8, 9 will occur until the portions 6, 7 have adapted themselves to the measurement of the grooves whereby the desired cold welding effect takes place. Thus, the flattened rib surfaces slide along the counter surfaces 11, 12 with continuously increasing pressure of the surfaces against each other. By a corresponding shaping, selection of the appropriate number and arrangement of the ribs 8, 9, on one hand, and of the rib angle and of the angle α of the counter surfaces 11, 12, on the other hand, it is possible to adapt the connection to the intended stresses to which the connection will be subjected.

Figure 6:
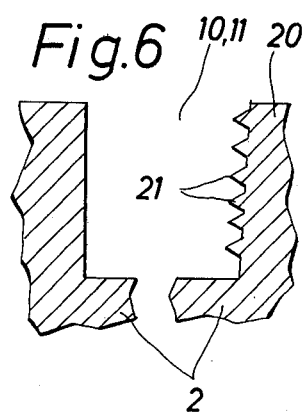
FIG. 6 shows a modification of a welded connection according to the invention in which one grooved wall is provided with ribs.
Figure 2:
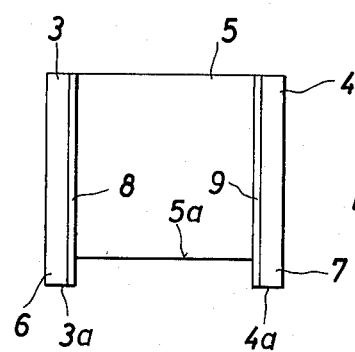
Figure 5:
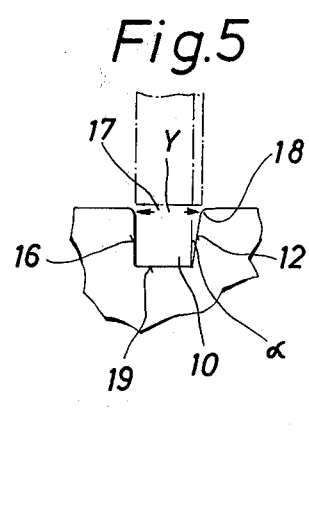
Figure 3:
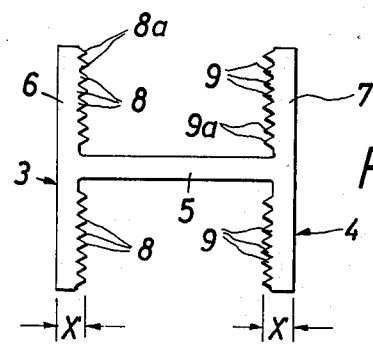
Figure 4:
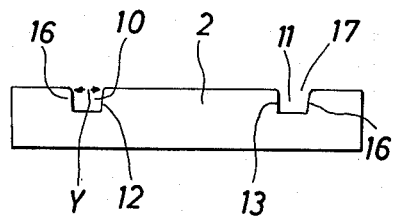

According to the embodiment illustrated in FIG. 6, the grooved wall 20 cooperating with the ribs 8, 9 of the sections 6, 7 is provided with ribs 21 which extend in the longitudinal direction of the grooves and are of triangular cross section. While the ribs 8, 9 extend in the direction in which the respective part is inserted into the other part, i.e. in the direction of the arrow 22 in FIG. 1, the ribs 21 extend transverse to the ribs 8, 9 and form an uninterrupted counter surface for the ribs 8, 9.

With the cold welding connection according to FIGS. 7, 8 and 8a, two substantially identical pipe sections 23, 24 of square or rectangular cross section are to be connected to each other. In this instance again one connecting part 25 serves for connecting the two parts 23, 24 to each other each of which has two parallel grooves 26, 27 and 28, 29 respectively. The connecting part 25 has an I-beam shaped cross section and its arms 30, 31 have outwardly directed ribs 32, 33. The outer surface of the arms 30, 31 may be so designed that one half thereof (FIG. 8b) is provided with ribs extending in the longitudinal direction of the connecting part 25 which ribs are welded to the walls of the grooves 26, 27, whereas the other half of the outside surface of the arms 30, 31 is provided with ribs extending transverse thereto so that the last mentioned ribs again extend perpendicularly with regard to the grooves 28, 29 and cooperate with the walls thereof.

FIGS. 8 and 8a show a modification of a cold welded connection according to the invention. In this modification again a part 25 is used which, however, is not inserted into the grooves 28, 29 but instead is inserted into the hollow space of the profile 24 in which instance the ribs of the legs or arms 30, 31 cooperate with the walls of the recesses 34, 35 of the second profiled connecting part 24.

By means of the connections shown in FIGS. 9–11, the end sections 40 and the central section 41 of a palette 43 are to be connected to each other. To this end, the end sections 40 are either provided with a longitudinal ledge 44 or with a longitudinal groove 45 at their flanges 46, whereas the central sections 41 have their flanges 47 provided with a longitudinal strip or ledge 48 and their flanges 49 provided with a groove 50. The side walls 51, 52 of groove 50 are inclined toward each other and toward the groove bottom 43. The two sides 48a, 48b of the ledge or strip 48 are provided with parallel ribs 54, 55 which are inserted in the direction of the arrow L of strips 48 into the grooves 50. The distance between the acute angular edges 54a, 55a of the ribs 54, 55 located opposite to each other is slightly greater than the width of the groove 50 at the groove edge 50a.

In order to assure the insertion of ledge 48 into the center of groove 50, the free end of ledge 48 has two symmetrically inclined surfaces 56, 57 (FIG. 10) between which there is formed a head surface. Between the latter and the groove bottom 53 a seal 58 may be inserted.

The invention is furthermore shown in FIG. 12 in connection with a round pivot 60. This pivot has a section 61 which is to be pressed into the truncated cone-shaped bore 62 of a second part 63. The insertion is effected in the direction of the arrow M. The ribs 64 likewise extend in the direction of the arrow M while the outer diameter of the section 61 determined by the outer edges 64a is somewhat larger than the diameter of the bore 62 at the upper edge 62a thereof.

According to the embodiment illustrated in FIG. 13, the ledges or pivots 65 are to be connected to the part 66, for instance, a bumper bar while the pivots or ledges 65 have a section 67 provided with ribs. This section 67 is to be pressed into the bores or grooves 68 in the manner described in connection with preceding embodiments of the invention. The pivot or the ledge 67 has a second section 69 which is likewise provided with ribs and extends into the bores or grooves 70 of a part 71, for instance, a holding arrangement for the bumper. The section 69 is likewise cold welded to the walls of the bores or grooves 70. Thus, with the embodiment of FIG. 13, the cold welded part 65 connects the parts 66 and 67 by cold welding of one or more intermediate elements, in this specific instance of the pivots or ledges 65.

As will be evident from the above, the present invention concerns a slide welded system, which means a welding together of two elements or parts which slide into each other under increasing pressure of the two surfaces sliding upon each other, namely the rib edges of one part which are flattened to an increasing degree and the counter surface of the other part. This means that considerably lower pressures are to be applied than is the case with a pure pressure welding while in addition thereto the connection according to the present invention is considerably stronger than is the case with pure pressure welding.

It is, of course, to be understood that the present invention is, by no means, limited to the particular showing in the drawings but also comprises any modifications within the scope of the appended claims.

What is claimed is:

1. The method of connecting two light metal members which comprises: forcing one portion of one member into a groove in the other member, in which the one portion is of greater transverse dimension between opposite engaging surfaces than the corresponding dimension of said groove, the opposite engaging surfaces on one member converging in the direction of movement of said one portion into said groove, and at least one engaging surface of said portion and groove has a plurality of ribs extending in the direction of movement of said portion into said groove, said ribs being adapted to engage a complementary surface on the other member, the height of said ribs being substantially greater than the amount of convergence of said converging surfaces, said ribs removing any light metal oxidation coating on the corresponding engaging surface and being deformed under pressure as said portion is forced into said groove to cold weld said members together.

2. The method of connecting two members as claimed in claim 1, in which said ribs are on said portion and said groove has converging walls, said ribs and surfaces of said portion engaging the sides of said groove on entry into said groove.

3. The method of connecting two members as claimed in claim 1, in which said portion is circular with said ribs formed thereon, and said groove is circular with sides converging from its open end to the opposite end.

4. The method of connecting two metal members by cold welding, comprising forming a first member with a groove having opposite sides, a second member with a portion complementary to said groove having opposite sides engageable with the opposite sides of groove, the opposite sides of one of said members being parallel and the opposite sides of the other member converging in the direction of movement of said portion into said groove, a plurality of ribs being formed on at least one of said parallel sides, said ribs extending in the direction of movement of said portion into said groove, each of said ribs tapering to an edge from its base, the sides of said portion being spaced a distance at least as great as the distance between the sides of said groove at its open end, the amount of convergence of said converging sides being less than the height of said ribs, and said method also comprising forcing said portion into said groove with said sides in contact initially to deform said ribs and expose the underlying nascent metal to mutual contacting surfaces under the pressure on said surfaces.

5. The method of connecting two members as claimed in claim 4, in which said first member has the groove to form said opposite walls and said second member is a flange complementary to said groove, said flange having said ribs on both sides to engage both walls of said groove.

6. The method of connecting two metal members by cold welding, comprising forming a first member with a first pair of opposite walls facing toward each other, forming a second member wth a second pair of walls complementary to said first walls and engageable with said first walls when forced therebetween, the walls of one pair being parallel and the walls of the other pair converging in the direction of movement of said second pair of walls when moved between said first pair of walls, at least one of said parallel walls having ribs extending parallel to the direction of movement of said second pair of walls between said first pair of walls, each of said ribs tapering to an edge from its base on the wall, the amount of convergence of said converging walls being less than the height of said ribs, said method comprising the step of initially contacting both of said second walls with said first walls and then forcing the second walls between said first walls to deform said ribs and expose the underlying nascent metal to mutual contact so that the two members are cold welded together along the contacting surfaces under the pressure on said surfaces.

7. The method of connecting two members as claimed in claim 6, in which said first member is in the form of a tube with opposite side walls, and said second member has a pair of walls engaging the walls of said first member.

8. The method of connecting two metal members by cold welding, comprising forming a first member with a groove having two opposite sides converging inwardly from the open end, forming a second member with a projecting portion complementary to said groove having two parallel opposite sides engageable with said converging sides of said groove and ribs on at least one of said parallel sides extending in the direction of movement of said portion into said groove, each of said ribs tapering to an edge from its base, the distance between said parallel sides including the height of said ribs being at least as great as the greatest distance between said converging sides of said groove, the amount of convergence of said converging sides not exceeding the height of said ribs, said method comprising forcing said portion into said groove to deform said ribs and expose the underlying nascent metal on both members to make mutual contact, so that the two members are welded together along the contacting surfaces under the pressure on said surfaces.

9. The method of connecting two metal members by cold welding, comprising forming a first member with a groove having opposite sides, a second member with a portion complementary to said groove having opposite parallel sides engageable with the opposite sides of said groove, the opposite sides of the groove converging in the direction of movement of said portion into said groove, a plurality of ribs with parallel edges formed on at least one of said sides, said groove being wider than said portion by less than the height of said ribs, and the amount of convergence of said converging sides being less than the height of said ribs, said method further comprising forcing said portion into said recess with said sides and ribs in contact initially to deform said ribs and expose the underlying nascent metal to mutual contact to weld the two members together along the contacting surfaces under the pressure on said surfaces.

* * * * *